(12) United States Patent
Wallace et al.

(10) Patent No.: US 11,893,680 B2
(45) Date of Patent: Feb. 6, 2024

(54) COMPUTING DEVICE AND METHOD FOR SUBSEA VIDEO OBJECT DETECTION

(71) Applicant: Rovco Limited, Bristol (GB)

(72) Inventors: Iain Wallace, Bristol (GB); Pep Lluis Negre Carrasco, Bristol (GB); Lyndon Hill, Bristol (GB)

(73) Assignee: Rovco Limited, Bristol (GB)

( * ) Notice: Subject to any disclaimer, the term of this patent is extended or adjusted under 35 U.S.C. 154(b) by 454 days.

(21) Appl. No.: 17/291,684

(22) PCT Filed: Oct. 31, 2019

(86) PCT No.: PCT/EP2019/079847
§ 371 (c)(1),
(2) Date: May 6, 2021

(87) PCT Pub. No.: WO2020/094498
PCT Pub. Date: May 14, 2020

(65) Prior Publication Data
US 2022/0005265 A1    Jan. 6, 2022

(30) Foreign Application Priority Data

Nov. 6, 2018  (EP) .................................... 18204705

(51) Int. Cl.
*G06T 17/00*  (2006.01)
*G06V 20/10*  (2022.01)
*G06V 20/40*  (2022.01)
(52) U.S. Cl.
CPC .............. *G06T 17/00* (2013.01); *G06V 20/41* (2022.01); *G06V 20/10* (2022.01)

(58) Field of Classification Search
CPC ....... G06T 7/55; G06T 2200/04; G06T 7/251; G06V 20/64; G06V 10/96; G06V 20/653; G06V 20/40
See application file for complete search history.

(56) References Cited

U.S. PATENT DOCUMENTS

| 6,400,831 | B2 | 6/2002 | Lee et al. | |
|---|---|---|---|---|
| 2004/0086174 | A1* | 5/2004 | Sun | G06T 7/55 382/154 |

(Continued)

FOREIGN PATENT DOCUMENTS

WO    WO 2017/139049    8/2017

OTHER PUBLICATIONS

Kang et al., Two-view underwater 3D reconstruction for cameras with unknown poses under flat refractive interfaces, Pattern Recognition, vol. 69, 2017, pp. 251-269, ISSN 0031-3203, doi.org/10.1016/j.patcog.2017.04.006.*

(Continued)

*Primary Examiner* — Guillermo M Rivera-Martinez
(74) *Attorney, Agent, or Firm* — Potomac Law Group, PLLC; John J. Penny, Jr.

(57) ABSTRACT

A computing device for video object detection. Images from a camera are transferred in parallel to a first processor running object detection and a second processor running a 3D reconstruction. The object detection identifies a semantic object of interest and assigns a label to it and outputs the label information to an object mapper. The object mapper assigns the label to a component in the 3D model representing the object. The computing device can form part of a subsea or other harsh environment imaging system.

15 Claims, 4 Drawing Sheets

(56) References Cited

U.S. PATENT DOCUMENTS

| | | | | |
|---|---|---|---|---|
| 2007/0263000 | A1* | 11/2007 | Krupnik | G06T 7/251 345/473 |
| 2012/0099402 | A1* | 4/2012 | Debrunner | G06V 20/64 367/134 |
| 2015/0092178 | A1* | 4/2015 | Debrunner | G01S 17/42 356/4.01 |
| 2016/0231278 | A1* | 8/2016 | Goroshevskiy | G01N 27/82 |
| 2017/0351933 | A1 | 12/2017 | Bleiweiss | |
| 2020/0105019 | A1* | 4/2020 | Boyle | H04N 23/90 |

OTHER PUBLICATIONS

Oleari et al., Performance Evaluation of a Low-Cost Stereo Vision System for Underwater Object Detection, IFAC Proceedings Volumes, vol. 47, Issue 3, 2014, pp. 3388-3394, ISSN 1474-6670, ISBN 9783902823625, www.sciencedirect.com/science/article/pii/S1474667016421294.*

European Examination Report, EP19 801 766.7, dated Mar. 13, 2023, 6 pages.

Bazeille et al., "Color-based underwater object recognition using water light attenuation," Intel Serv Robotics, 2012, 5:109-118, https://doi.org/10.1007/s11370-012-0105-3.

Thompson, "Maritime Object Detection, Tracking, and Classification Using Lidar and Vision-Based Sensor Fusion," Dissertations and Theses, 2017, 55 pp (https://commons.erau.edu/edt/377).

Extended European Search Report dated May 27, 2019 in EP Application No. 18204705.0.

Search and Examination Report dated May 2, 2019 in GB Application No. 1818093.5.

International Search Report and Written Opinion issued in PCT/EP2019/079847 dated Feb. 12, 2020.

Xu Xiao et al: 11 Underwater 3D object reconstruction with multiple views in video stream—via structure from motion11 , Oceans 2016 Shanghai, IEEE, Apr. 10, 2016 (Apr. 10, 2016), pp. 1-5, XP032909515, DOI: 10.1109/OCEANSAP.2016.7485694 [retrieved on Jun. 3, 2016] Section II; Section IV; Section V• Section VI; Section VII; igures 1, 2.

Lai Kang et al: "Two-view underwater 3D reconstruction for cameras with unknown poses under flat refractive interfaces", Pattern Recognition., vol. 69, Apr. 21, 2017 (Apr. 21, 2017), pp. 251-269, XP055665336,GBISSN: 0031-3203, DOI:10.1016/j.patcog. 2017.04.006abstractSection I; Section 4; Section 5;figures 1, 10-18.

Kuanpeng Li et al: "Semi-Dense 3D Semantic Mapping from Monocular SLAM". arxiv.org, Cornell University Library, 201 Olin Library Cornell University Ithaca, NY 14853, Nov. 13, 2016 (Nov. 13, 2016), XP080731390. Section 1; Section 3; Section 3.2; Sections 4 and 5.; figures 1, 2.

John McCormac et al: "SemanticFusion: Dense 3D Semantic Mapping with Convolutional Neural Networks", arxiv.org, Cornell University Library, 201 Olin Library Cornell University Ithaca, NY 14853, Sep. 16, 2016 (Sep. 16, 2016), XP080727216, DOI: 10.1109/ICRA.2017.7989538 Section I; Section III; Section IV-B and IV-F; Section V;figures 1,2.

Asif Umar et al: "Simultaneous dense scene reconstruction and object labeling", 2016 IEEE International Conference on Robotics and Automation (ICRA), IEEE, May 16, 2016 (May 16, 2016), pp. 2255-2262, XP032908397, DOI: 10.1109/ICRA.2016.7487374 Section 1; Section III; Section IV; figures 1, 2, 3; table II.

Vineet Vibhav et al: "Incremental dense semantic stereo fusion for large-scale semantic scene reconstruction", 2015 IEEE International Conference on Robotics and Automation (ICRA), IEEE, May 26, 2015 (May 26, 2015), pp. 75-82, XP033168394, DOI: 10.1109/ICRA.2015.7138983 Section 1; Section III; Section IV; Section VI; figures 1, 2, 6.

Hermans Alexander et al: "Dense 3D emantic mapping of indoor scenes from RGB-D images", 2014 IEEE International Conference on Robotics and Automation (ICRA), IEEE, May 31, 2014 (May 31, 2014), pp. 2631-2638, XP032650067, DOI: 10.1109/ICRA.2014.6907236 Section I; Section III; Section VII-C; figures 1, 2, 5.

* cited by examiner

COMPUTING DEVICE AND METHOD FOR SUBSEA VIDEO OBJECT DETECTION

Priority is claimed under 35 U.S.C. § 365 to PCT/EP2019/079847 filed on Oct. 31, 2019 and under 35 U.S.C. § 119 to EP 18204705.0 filed on Nov. 6, 2018, both of which are hereby incorporated by reference in their entireties.

BACKGROUND

Various forms of automatic object detection and evaluation from video exist such as the inspection of objects on conveyor belts for production lines, and moving object detection for security cameras.

SUMMARY

The present inventors have devised a computing device and method for detecting and locating objects in video which can exhibit one or more of the following advantages relative to known systems:
  improved accuracy
  improved robustness
  improved efficiency
  faster implementation
  reduced cost By way of a non-limiting overview, embodiments of the invention relate to a computing device in which images from a camera are transferred in parallel to a first processor performing object detection and a second processor performing 3D reconstruction. The object detection identifies a semantic object of interest, assigns a label and identifies its location in the image. The 3D reconstruction generates a 3D model based on the images. An object mapper has access to the label and 2D location information and also the 3D model and maps the label to a component in the 3D model representing the object. The 3D location and label can then be output to another device or process. The computing device can form part of a subsea or other harsh environment imaging system.

In accordance with a first aspect of at least one embodiment of the invention, there is provided a computing device for video object detection, the computing device comprising:
  a first data processor configured to execute object detection or recognition to:
    receive a first image;
    detect or recognise an object in the first image; and
    assign a label and 2D location to the object;
  a second data processor distinct from the first data processor, the second data processor being configured to execute 3D reconstruction to:
    receive a second image; and
    process the second image in conjunction with further image data comprising one of more different views of the object to develop a 3D model comprising a 3D model component representing the object; and
  an object mapper communicatively coupled to the first data processor and the second data processor, the object mapper being configured to map the label to the 3D model component and output the label and 3D co-ordinates of the 3D model component.

Thus, the computing device according to at least one embodiment of the first aspect efficiently divides 3D video object detection into tasks that can be performed in parallel suitable for implementation with modern computers, using multiple computers and/or multicore CPUs. The invention does not require that slower tasks in the system work at the same rate as faster tasks, therefore tasks being performed in parallel can be running at an optimum speed and the overall implementation can be fast and efficient. Thus, the computing device can detect objects and create a 3D model with high bandwidth image data of large spatial and colour resolution, colour depth and high framerate, faster and/or with reduced processing power and associated heat in comparison to a system which utilises a single processor for both tasks. Moreover, separating the object detector subsystem from the 3D reconstruction subsystem allows the object detector to be trained easily using historical image data without requiring historical 3D data. For resource constrained computer systems such as those used in harsh environments such as underwater, subsea, environment, etc. the system design of the computing device according to the first aspect allows efficient use of available processing power. Although the object mapper requires access to the model to work, it does not need to read the whole model in order to map the label and output the 3D coordinates.

The 3D model can comprise a point cloud or a depth map or any other 3D representation of the scene captured or partially captured. The 3D model component can comprise a subset of the points within the point cloud which represent the object.

The first image can be identical to the second image, such as a monoscopic input to the 3D reconstruction. Alternatively, the first image can originate from one view and the second image can originate from a second view arranged in a stereoscopic pair. By using the same first image data for both 3D reconstruction and object detection, better correlation for the estimated position of the label can be obtained. Known methods for correlating detected objects and 3D locations use multiple sensors and a calibration transform between the two sensors, which may change over time as parts of the system are moved or the system bumps into other objects. Using the same image for detection as for reconstruction means that there is no required calibration transform between the different sensors. As a calibration transform can be imperfect or change in use due to environmental changes or damage to the camera system, a source of positional inaccuracy is removed from the system.

Developing the 3D model can comprise developing a virtual environment, in which sizes/distances and/or orientation are relative to each other, using the first image and then mapping the virtual environment to a world environment, in which sizes/distances and/or orientation are relative to the real world. This can be advantageous in a single camera system.

The computing device according to the first aspect of at least one embodiment of the invention can comprise a data link between the first data processor and the second data processor arranged such that the first data processor can transmit data to the second data processor and/or second data processor can transmit data to the first data processor.

The data can comprise image data and/or image metadata. Image metadata can relate to the scale of the object. Thus, the 3D model data from the second data processor can be used to augment the labelling task of the first data processor, and the scene depth can be used to help the object labelling process to refine its output. The object detector does not require 3D data to function.

The second data processor can be configured to receive a third image after the second image, process the third image to determine whether a threshold has been reached relating to a degree of difference between the third image and the second image; and transmit data representing the third image to the first data processor via the data link if the threshold has been reached. The data representing the third image can comprise the third image or for example a unique image identifier which enables the object detection to locate the third image from a repository accessible to the first data processor, such as a local memory device. Thus, the second data processor can compare received images. The threshold relating to a degree of difference can be the difference in perspectives of the object from the camera and each image which passes the threshold can be considered a "key frame". Every time a key frame is identified the camera view is typically a unique view on the model; unique views are ideally suited to be sent to the object detector as a full set of key frames provide all the views of an object necessary to create a complete model of the object.

The first data processor can receive an identical image for each image received by the second data processor.

The first data processor can be arranged to process key frames identified by the second data processor but not process one or more non key frames within the video stream. Only one image is needed for object detection and any additional metadata is compact, whereas multiple images are usually required for 3D reconstruction. Thus, the object detection task on the first data processor can run without having to wait for 3D data from the second data processor. Therefore, the object detector does not need to process every input image, only key frames arriving at a reduced frame rate. This allows the object detector to either run more complex algorithms or to run relatively slowly at the reduced frame rate, requiring less processing power.

The object detector can be trained to recognise an object of a known fixed size and inform the second data processor for the 3D model scale. This can benefit single camera embodiments of the computing device. Likewise, object size from the 3D model can be provided to the object detector in the first data processor when a candidate object is an appropriate size, which can benefit multi camera embodiments.

A first camera can be communicatively coupled to the first data processor and second data processor to provide the first and second images respectively to the first data processor and second data processor. Thus, an image captured by the first camera can be simultaneously provided to both data processors as the first and second images.

The computing device can comprise a second camera distinct from the first camera and having a different but overlapping field of view with respect to the first camera and being communicatively coupled to the second data processor to provide a fourth image to the second data processor.

The computing device can comprise one or more further cameras, each having a different but overlapping field of view with respect to another camera to form a camera pair. Additional views can be used to make object reconstructions from different pairs of cameras.

The computing device can comprise a platform such as a metal or plastics frame to which each component of the computing device is mounted.

Each data processor of the computing device can form part of a respective camera module for imaging in harsh environments, the camera module comprising:
    a casing defining a sealed interior space, the casing being arranged to be mounted on a platform; and/or
    a camera arranged to face outwardly from the casing to capture images;
    the data processor; and/or
    an internal data link coupled between the camera and the data processor to transfer image data from the camera to the data processor; and/or
    an external data link coupled to the camera or the data processor and being arranged to communicatively couple the camera module to an external computing device distinct from the camera.

The casing can be arranged to isolate some or all of the components of the computing device from the harsh environment.

The camera module can include a synchronisation subsystem coupled to the external data link and arranged to synchronise a system clock of the data processor or the camera to system clocks of one or more further distinct camera modules with an accuracy greater than the inter frame time of the camera or cameras. The data processor can include the synchronisation subsystem.

The platform can comprise a remotely operable or autonomous mobile platform such as an underwater remotely operable vehicle (ROV), an autonomous underwater vehicle (AUV), an unmanned air vehicle (UAV), an unmanned ground vehicle (UGV), an unmanned underwater vehicle (UUV), or an unmanned surface vehicle (USV).

When applied to a vehicle such as an autonomous or unmanned system, the computing device can be used for simultaneous localization and mapping (SLAM).

In one example, the platform can comprise a subsea remotely operable or autonomous vehicle including a propulsion system, a steering system and a command controller arranged to control the propulsion system and the steering system in accordance with command signals provided from a control station which is remote with respect to the vehicle.

In accordance with a second aspect of at least one embodiment of the invention, there is provided a computer implemented method for video object detection, the method comprising:
    at a first data processor:
        receiving a first image;
        detecting an object in the first image; and
        assigning a label and 2D location to the object;
    at a second data processor distinct from the first data processor:
        receiving a second image containing the object; and
        processing the second image in conjunction with further image data comprising one of more different views of the object to develop a 3D model comprising a 3D model component representing the object; and
    at an object mapper, mapping the label to the 3D model component and outputting the label and 3D co-ordinates of the 3D model component.

The first image and the second image can be sent to and/or received at the first and second data processors at the same time.

The method can comprise the second data processor:
    receiving a third image after the second image;
    processing the third image to determine whether a threshold has been reached relating to a degree of difference between the third image and the second image; and
    transmitting image data to the first data processor identifying a key frame image via a data link if the threshold has been reached.

The second data processor can receive the third image while the first data processor is processing the first image. This can allow the first data processor to run more complex object detection algorithms or require less power. The first data processor can therefore operate at a lower frame rate than the second data processor.

The third image can contain the object from a different view point with respect to the second image.

The first and second images can be received from a first camera and the second data processor can receive a fourth image from a second camera distinct from the first camera, the fourth image being received by the second data processor in parallel with the second image, the fourth image containing the object from a different view point with respect to the second image.

DETAILED DESCRIPTION

Figure 1:
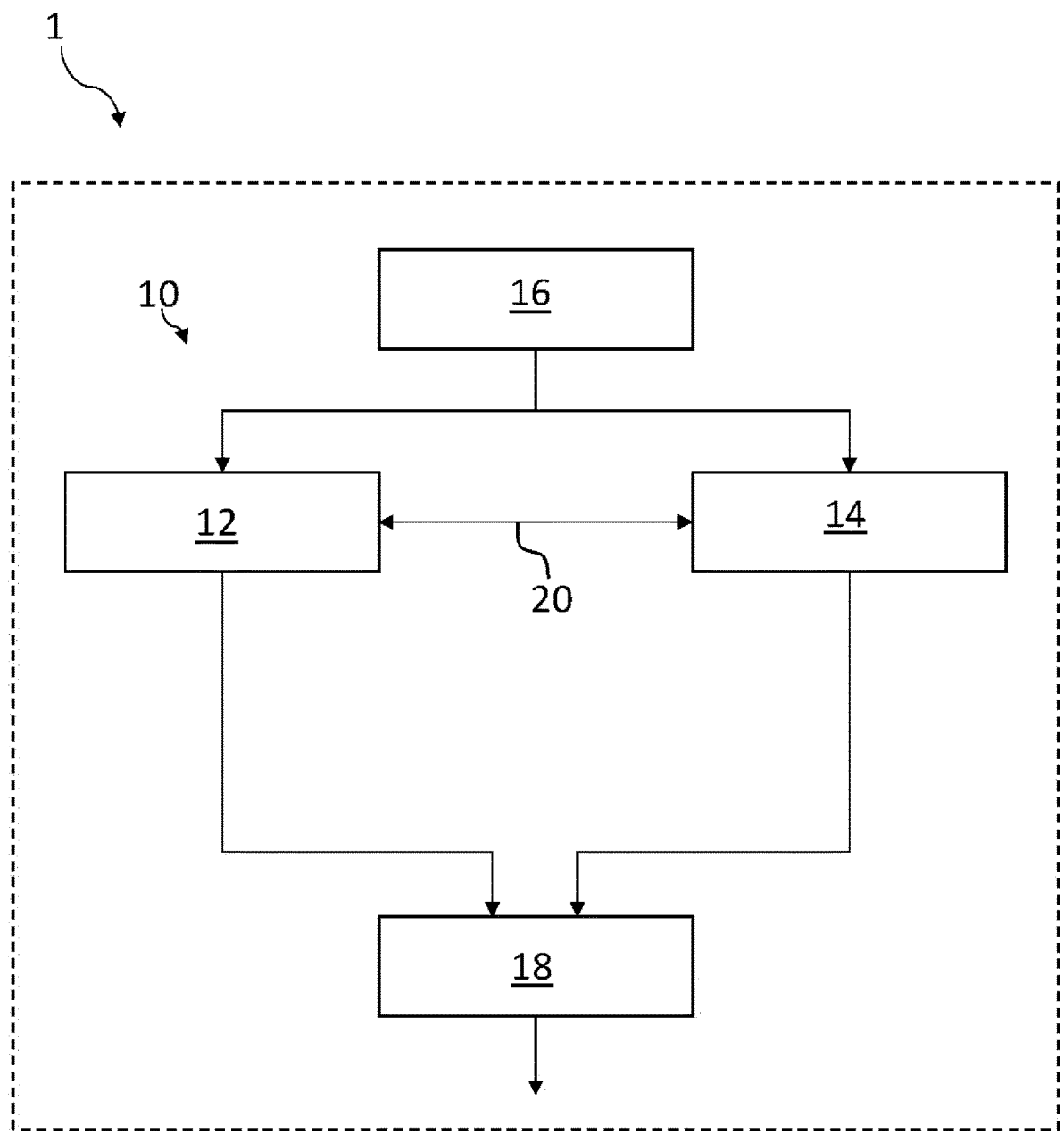
FIG. 1 is a diagram of a computing device according to an embodiment of the invention.

Referring to FIG. 1, a computing device for video object detection according to an embodiment of the invention is shown generally at 10. The computing device 10 can be arranged to form part of a vehicle mounted camera system 1 or other platform to perform video object detection and location in 3D.

The computing device 10 includes first and second data processors 12, 14 communicatively coupled in parallel to a first camera 16 to receive images from the camera 16. The first and second data processors 12, 14 are communicatively coupled to an object mapper 18 to provide processed data to the object mapper 18. The object mapper 18 can be implemented on a third data processor, or one of the first and second data processors 12, 14. Alternatively, the object mapper 18 can be implemented on a remote device which communicates with the computing device 10 via a wired or wireless data link.

The first data processor 12 and the second data processor 14 can be distinct computers or can be distinct processing cores/units on the same computer, such that processing on the first and second data processors 12, 14 can be executed in parallel, i.e. processed at the same time. The data processors 12, 14, 18 can each be coupled to other devices such as network interfaces (not shown) and volatile and non-volatile memory (not shown). The memory can store images, video, or metadata, as well as algorithms. The data processors 12, 14 can be suitable for computationally complex image processing and computer vision. For example, the data processors 12, 14 can comprise processing cores including (but not requiring) GPU cores and embedded processing for video codecs or AI operations, such as a NVidia Tegra™ system on a chip (SoC).

The first data processor 12 receives a first image from the camera 16. The first data processor 12 is arranged to execute object detection to detect semantic objects in the first image. The object detector finds areas of interest with meaningful semantic labels, for example, labelling the part of the image as a tree or a car, etc. The object detector then determines the boundary or point where a semantic object label applies. Any suitable type of known object detection can be employed such as machine learning or pattern/template matching. In one specific example, the object detection can be a Region-based Convolutional Neural Network (R-CNN) where region proposals are analysed by CNNs and classified by Support Vector Machines as to whether it is the object or not.

The second data processor 14 receives a second image from the camera 16. In this embodiment the second image is identical to the first image. The second data processor 14 is configured to execute a 3D reconstruction to develop a 3D model. To generate a 3D model from video or camera images, the 3D reconstruction can take key points that for example make up the edges of the object in the second image and associates the key points with corresponding key points from other images, such as earlier captured images or images captured concurrently by other cameras. Knowing the camera pose associated with each image, rays can be projected from the camera positions through the key points of each image and points where the rays for a particular point intersect or are best fit in 3D space represent the 3D location of the corresponding points in the 3D model. The 3D reconstruction can be Structure from Motion or any other appropriate technique that generates a 3D model from video or camera images. The 3D model can for example comprise a point cloud. The 3D reconstruction can either start building the 3D model from the second image, or use the second image to augment a 3D model already being constructed by the second data processor 14.

The second image also includes the semantic object. Thus, the 3D model developed by the second data processor 14 includes a 3D model component representing the semantic object; for example, a subset of points within the point cloud that represent the object. In this embodiment the 3D reconstruction creates a dimensional transform that can take key points for object in the second image and associate the key points with corresponding points in the 3D model representing the object. The key points of the object can comprise the silhouette of the object, and/or edges inside the silhouette of the object. The edges inside the silhouette region are determined to be on the surface of the object. In other embodiment this process can be performed by the object mapper.

In the illustrated embodiment the object mapper 18 receives, as inputs, the label of the object and key points of the object as 2D co-ordinates in the image from the first data processor 12 and also the dimensional transform from the second data processor 14. Applying the dimensional transform to the labelled 2D object points will produce 3D points which are also labelled as the object which correspond to the 3D model data. In other embodiments the object mapper can have access to any type of 3D model data that enables mapping to be performed such as the whole 3D model, or part of the 3D model including the object.

The output of the object mapper 18 is the 3D volume defined by the bounds of the selected, labelled object points. The object mapper 18 can output labelled 3D model data to an external device via a suitable output interface such as USB. The labelled 3D model data can be accumulated and re-assembled at the external device to create a full 3D model with many labelled objects.

While developing the 3D reconstruction on the second data processor 14, the 3D reconstruction can, if necessary, be mapped from the virtual environment to a real world environment via a local reference frame. This may for example be advantageous if the computing device 10 has a single camera and thus lacks depth perception with a known scale. A 3D reconstruction is a model with its own reference frame and scale which is relative to itself. A local reference frame has the same reference frame as the environment the computing device 10 is moving through or observing. A local reference frame also has a scale relative to the real environment, i.e. 1 m in the real environment=1 m in the local reference frame. Therefore, the computing device 10 can determine the position of objects within the reference frame it is moving through.

The computing device 10 also can include a data link 20 to communicatively couple the first data processor 12 and the second data processor 14 such that the first processor 12 can transmit data to the second data processor 14 and/or the second data processor 14 can transmit data to the first data processor 12.

The data link 20 can be used to transfer metadata between the data processors. If the object detection is trained to recognise an object of a known fixed size, it can inform the 3D reconstruction of the 3D model scale using the data link 20. Also, if the 3D model contains information relating to the scale of components then the second data processor 14 can similarly use the data link 20 to inform and aid the labelling task of the object detector, which can make object detection faster and more efficient. The object detection can request 3D model data from the reconstruction regarding potential detection regions and check if edges in the 3D model match the extremes of the object in the 2D view.

To create an accurate 3D model the 3D reconstruction requires multiple input images. Put another way, to model a 3D object, multiple images at different angles around the object help to build up a more reliable 3D model of the object. If two images are taken sequentially and the camera 16 has a high capture rate, then the two images are likely to be very similar and the latter image received will add little information over the previous image. "Key frames" can be defined by the degree of difference between two unique views of an object. The 3D reconstruction can be arranged to compare a received third image with the preceding second image (or an earlier image) to determine the degree of difference. The third image can contain the object from a different view point with respect to the second image due to movement of the object and/or camera 16. Once a difference threshold has been exceeded the received image is marked as a key frame. In other embodiments key frames can be identified by a data processor other than the second data processor 14 and/or other means such as waiting a fixed time between key frames, e.g. 1 second or selecting every nth frame. Alternatively, an inertial measurement unit can be used to determine the camera position has moved enough to initiate a key frame.

The 3D reconstruction typically processes all of the input images (i.e. the camera 16 output dictates the processing power of the second data processor 14) and chooses key frames to add points that fit well with the model under construction. Points from the key frames are joined to form a point cloud that can be processed into mesh and rendered as a solid object with computer graphics. Every time a key frame is added, the camera view is typically a unique view on the model. Unique views are ideally suited for input to the object detection, as a full set of key frames can provide all the views of an object necessary to create a complete model of the object.

Once a key frame has been identified by the second data processor 14, the second data processor 14 can transmit an image reference to the first data processor 12 via the data link 20, which identifies the key frame image. This can for example be a unique identifier that the first data processor 12 can use to locate the key frame in a storage unit of the first data processor 12. Alternatively, the second data processor 14 can be arranged to transmit the key frame to first data processor 12 via the data link 20. Thus, in embodiments of the invention the object detector can be processing all frames or only key frames, with the first data processor 12 receiving images directly from the image source and/or via the second data processor 14.

If presented with key frame information, the object detection does not need to process every frame captured by the camera 16, but rather only key frames which are likely to arrive at a reduced image capture rate in comparison to the stream of input images. The second data processor 14 can therefore receive the third image while the first data processor 12 is processing the first image. This allows the object detector to run more complex algorithms or to require less power.

Thus, the computing device 10 efficiently divides a 3D video object detection into tasks that can be performed in parallel suitable for implementation with modern computers, using multiple computers and/or multicore CPUs. The invention does not require that slower tasks in the system work at the same rate as faster tasks, therefore tasks being performed in parallel can be running at an optimum speed and the overall implementation can be fast and efficient. Thus, the computing device can detect objects and create a 3D model with high bandwidth image data of large spatial and colour resolution, colour depth and high framerate, faster and/or with reduced processing power and associated heat in comparison to a system which utilises a single processor for both tasks. Moreover, separating the object detector subsystem from the 3D reconstruction subsystem allows the object detector to be trained easily using historical image data without requiring historical 3D data or the data required to create it. For resource constrained computer systems such as those used in harsh environments such as underwater, subsea, environment, etc. the system design of the computing device according to the first aspect allows efficient use of available processing power.

Figure 2:
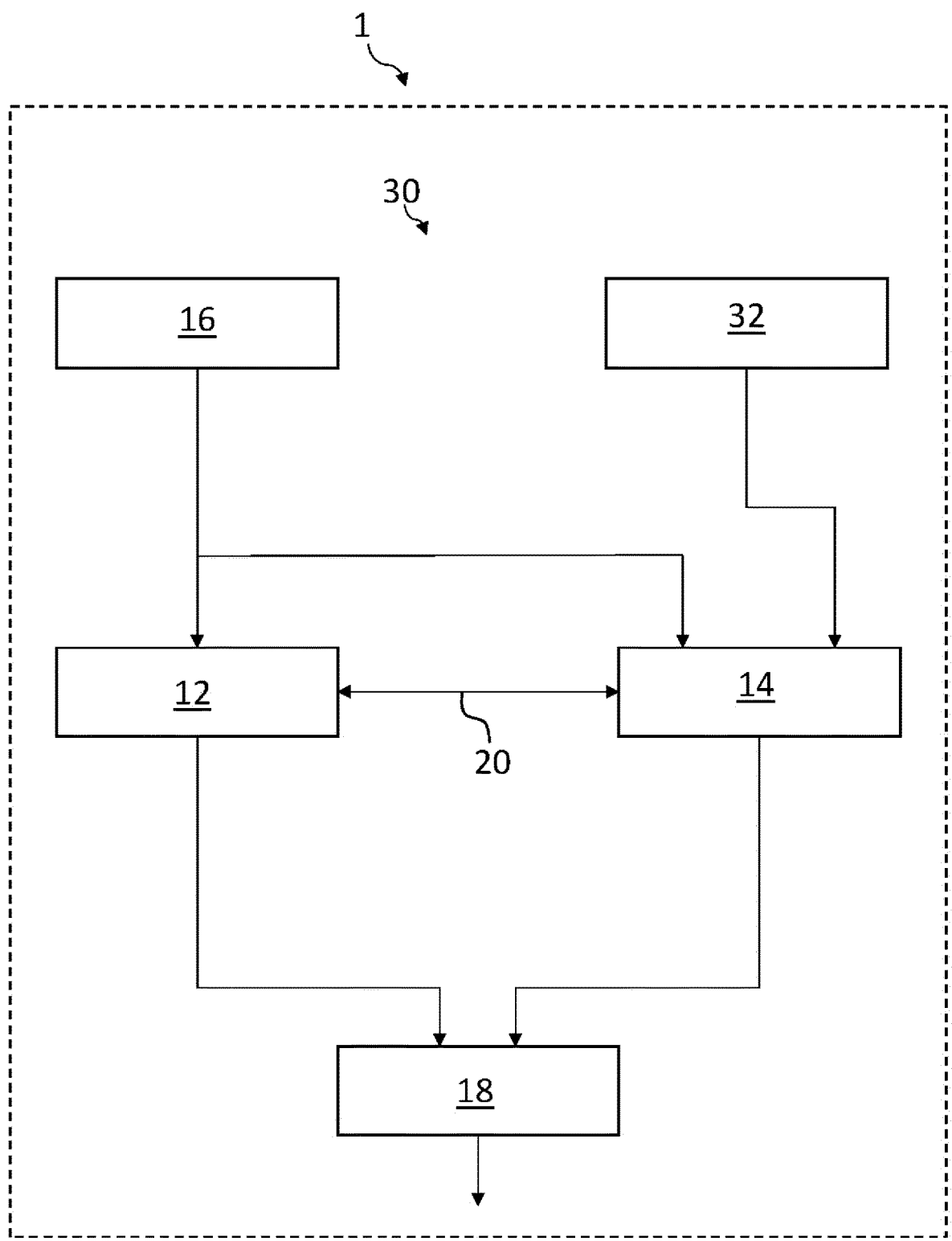
FIG. 2 is a diagram of a computing device according to a further embodiment of the invention.

Referring to FIG. 2, a computing device according to a further embodiment is shown generally at 30. The computing device 30 of FIG. 2 is similar to the computing device 10 of FIG. 1 and for brevity the following description will focus on the differences and like parts have been given the same reference numerals.

The computing device 30 additionally includes a second camera 32 which is communicatively coupled to the second data processor 14 to provide a fourth image to the 3D reconstruction, which can be supplied in parallel with the second image from the first camera 16.

The cameras 16, 32 are mounted in a known spatial arrangement such as being mounted on a common platform. The cameras 16, 32 are arranged with overlapping fields of view such that an object appears in images output from both cameras but differs in appearance due to a difference in the angle of observation. The second and fourth images enable the 3D reconstruction to scale the object size from the developed model, which can inform the object detection when a candidate object is an appropriate size, using the data link 20.

In other embodiments, one or more further cameras can be provided with different but overlapping fields of view relative to the first and/or second cameras 16, 32, or pairs of additional cameras, such that additional views can be used to make object reconstructions from different pairs of cameras. The reconstructions can run in additional data processors, all feeding back to the semantic object detector running in the first data processor.

Figure 3:
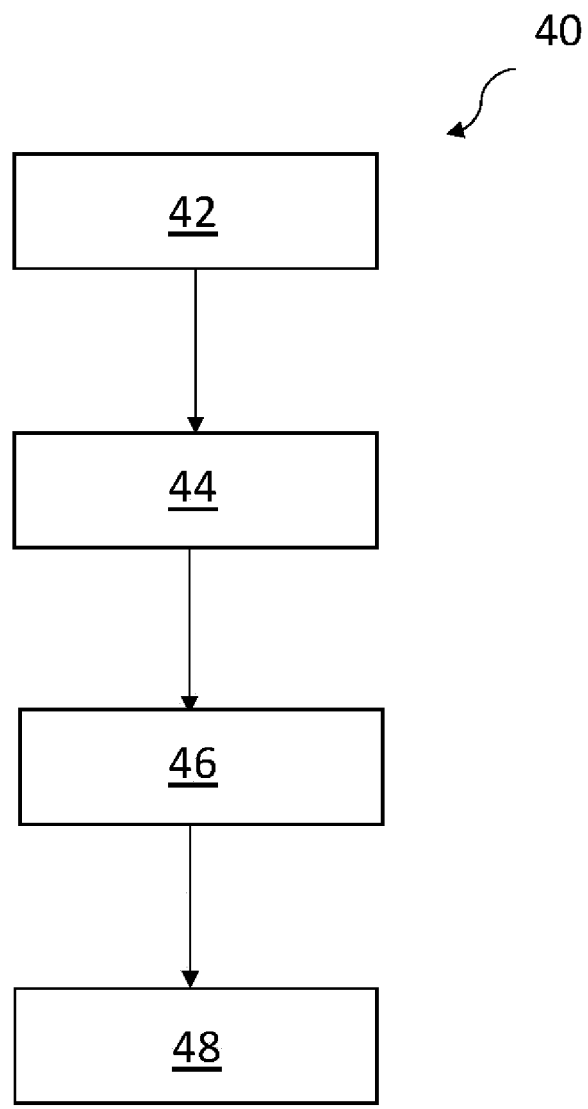
FIG. 3 is a diagram of a computer implemented method according to an embodiment of the invention.

Referring to FIG. 3, embodiments of the invention extend to a computer implemented method for video object detection, shown generally at 40.

At step 42 the method comprises, at a first data processor: receiving a first image; detecting an object in the first image; and assigning a label and 2D location to the object.

At step 44 the method comprises, at a second data processor distinct from the first data processor: receiving a second image containing the object; and processing the second image to develop a 3D model comprising a 3D model component representing the object. The first and second images can be identical and/or sent to the first and second data processors respectively at the same time. The second data processor can receive one or more further images while the first data processor is processing the first image, the further images containing the object from a different view point with respect to the second image.

At step 46 the method comprises an optional step of, at the second data processor: receiving a third image after the second image; processing the third image to determine whether a threshold has been reached relating to a degree of difference between the third image and the second image; and transmitting image data to the first data processor identifying a key frame image via a data link if the threshold has been reached.

The first and second images can be received from a first camera and at step 48 the method comprises an optional step in which the second data processor receives a fourth image from a second camera distinct from the first camera, the fourth image being received by the second data processor at the same time as the second image, the fourth image containing the object from a different view point with respect to the second image.

At step 48 the method comprises, at an object mapper, mapping the label to the 3D model component and outputting the label and 3D co-ordinates of the 3D model component.

Figure 4:
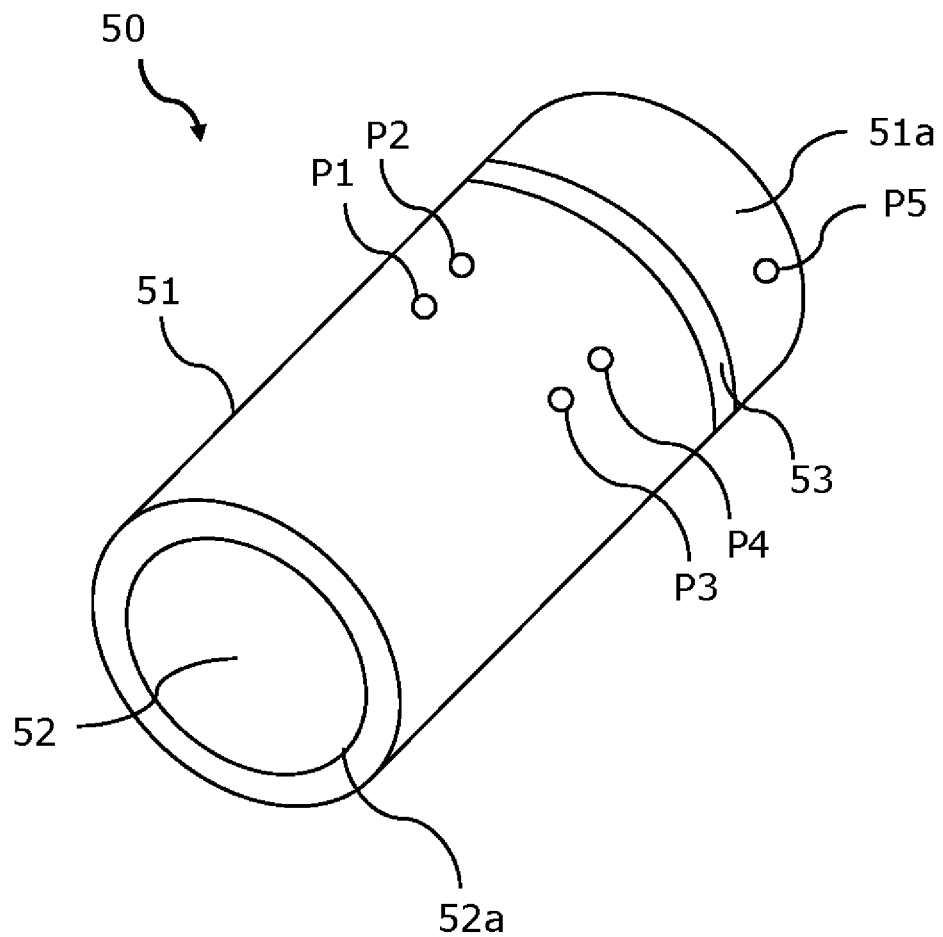
FIG. 4 is a diagram of a camera module according to an embodiment of the invention, including a computing device according to an embodiment of the invention.

FIG. 4 shows an example of a vehicle mounted camera system 1, which in this embodiment is a camera module 50 for imaging in harsh environments. Each camera as described above can form part of a respective camera module 1. The camera module 1 comprises a casing 51 that defines a watertight housing having an interior space. One end of the casing 51 includes a transparent window or lens 52*a*. A camera 52 is mounted within the interior space and arranged to capture images of the exterior environment through the window 52*a*. The interior space of the casing 51 can be accessed by removing a casing end cap 51*a* which is removably coupled to a body of the casing 51 via an o-ring sealed flange. An optional seal 53 is provided between the casing end cap 51*a* and the body of the casing to inhibit water ingress. The casing 51 of this embodiment can be formed from stainless steel and is cylindrical in shape so as to be structurally resistant to high pressures which may be experienced by the camera module 1 in an underwater harsh environment such as deep underwater environment and/or a subsea oil and gas infrastructure site. In other embodiments the material and/or shape of the casing 51 can be changed depending on the deployment environment, e.g. aluminium, copper beryllium, titanium, plastic, ionomers, PEKK, carbon fibre or ceramics in order to provide stress, chemical and/or temperature resistance. It is preferred that the material and shape of the casing 51 results in a strong and rigid structure. The shape of the casing 51 can be any pressure resistive shape such as a prism or cylinder. The camera 52 can form part of the casing 51 such that the casing 51 forms a fluid seal with at least part of the camera 52, e.g. the lens of the camera 52. Other end cap seals can be formed using methods including through-bolts or a threaded tube. Some or all of the component of the computing device 10 can be housed within the casing 51. Ports P1-P5 can be provided for wired connections to other camera modules, computing devices or the like to provide external data links while the camera module is operating in a harsh environment such as subsea.

Although the invention has been described above with reference to one or more preferred embodiments, it will be appreciated that various changes or modifications can be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A subsea computing device for subsea video object detection, the subsea computing device comprising:
   a first data processor configured to execute object detection to:
      receive a first image;
      detect an object in the first image; and
      assign a label and location to the object;
   a second data processor distinct from the first data processor, the second data processor being configured to execute 3D reconstruction to:
      receive a second image; and
      process the second image and a third image to develop a 3D model comprising a 3D model component representing the object;
   an object mapper communicatively coupled to the first data processor and the second data processor, the object mapper being configured to map the label to the 3D model component and output the label and 3D co-ordinates of the 3D model component;
   a first camera communicatively coupled to the first data processor and the second data processor and arranged to provide the first and second images to the first and second data processors respectively; and,
   a second camera distinct from the first camera having a different but overlapping field of view with respect to the first camera and being communicatively coupled to the second data processor to provide the third image to the second data processor.

2. The subsea computing device of claim 1, wherein the first image is identical to the second image.

3. The subsea computing device claim 1, wherein developing the 3D model comprises developing a model environment using the second image and then mapping the model environment to a world environment.

4. The subsea computing device of claim 1, further comprising a data link between the first data processor and the second data processor arranged such that the first data processor can transmit data to the second data processor and/or the second data processor can transmit data to the first data processor.

5. The subsea computing device of claim 4, wherein the data comprises image data.

6. The subsea computing device of claim 5, wherein the second data processor is configured to:
   receive a fourth image after the second image;

process the fourth image to determine whether a threshold has been reached relating to a degree of difference between the fourth image and the second image; and transmit data representing the fourth image to the first data processor via the data link if the threshold has been reached.

7. The subsea computing device of claim 1, wherein each data processor forms part of a respective camera module for imaging in harsh environments, each camera module comprising:

a casing defining a sealed interior space, the casing being arranged to be mounted on a platform.

8. The computing device of claim 7, wherein each camera is arranged to face outwardly from a respective one of the casings to capture images.

9. The subsea computing device of claim 4, wherein the data comprises image metadata relating to the scale of the object.

10. A subsea vehicle comprising a subsea computing device, the subsea computing device comprising:

a first data processor configure to execute object detection to:

receive a first image;

detect an object in the first image; and assign a label and location to the object;

a second data processor distinct from the first data processor, the second data processor being configured to execute 3D reconstruction to:

receive a second image; and process the second image and third image to develop a 3D model comprising a 3D model component representing the object;

an object mapper communicatively coupled to the first data processor and the second data processor, the object mapper being configured to map the label to the 3D model component and output the label and 3D co-ordinates of the 3D model component;

a first camera communicatively coupled to the first data processor and the second data processor and arranged to provide the first and second images to the first and second data processors respectively; and, a second camera distinct from the first camera having a different but overlapping field of view with respect to the first camera and being communicatively coupled to the second data processor to provide the third image to the second data processor.

11. A computer implemented method for subsea video object detection, the method comprising:

at a first data processor:

receiving a first image;

detecting an object in the first image; and assigning a label to the object;

at a second data processor distinct from the first data processor:

receiving a second image containing the object; and processing the second image and a third image to develop a 3D model comprising a 3D model component representing the object; and at an object mapper, mapping the label to the 3D model component and outputting the label and 3D co-ordinates of the 3D model component, whereby the first and second images are received from a first camera and the second data processor receives the third image from a second camera distinct from the first camera.

12. The computer implemented method of claim 11, further comprising:

at the second data processor:

receiving a fourth image after the second image;

processing the fourth image to determine whether a threshold has been reached relating to a degree of difference between the fourth image and the second image; and transmitting image data to the first data processor identifying a key frame image via a data link if the threshold has been reached.

13. The computer implemented method of claim 11, whereby the first and second images are identical and/or sent to the first and second data processors respectively at the same time.

14. The computer implemented method of claim 11, whereby the second data processor receives a further image while the first data processor is processing the first image, the fourth image containing the object from a different view point with respect to the second image.

15. The computer implemented method of claim 11, whereby the third image is received by the second data processor at the same time as the second image, the third image containing the object from a different view point with respect to the second image.

* * * * *